3,756,860
ELECTRODES WITH MIXED CATALYSTS OF METAL CARBIDE FOR HYDROGEN FUEL CELLS

Horst Binder, Petterweil, and Wolfgang H. Kuhn and Gerd Sandstede, Frankfurt am Main, Germany, assignors to Battelle Institut, Frankfurt am Main, Germany
No Drawing. Filed Apr. 4, 1969, Ser. No. 813,717
Claims priority, application Germany, Apr. 4, 1968, P 17 71 112.5
Int. Cl. H01m 13/00
U.S. Cl. 136—120 FC          5 Claims

ABSTRACT OF THE DISCLOSURE

The invention relates to hydrogen electrodes for fuel cells whose high efficiency results from the use of supplemental treated tungsten-carbide catalysts and a process for the manufacture of such treated catalysts.

---

In general it is desirable to use for hydrogen fuel cells acid electrolytes in order to avoid carbonization which builds up with alkaline electrolytes through carbonaceous impurities of the fuel or the carbon dioxide of the air. Ordinary platinum or platinum group metals serve as catalysts but on account of their high prices and the small amounts of these metals being available, a search has been conducted for material which can be supplied in sufficient quantities and which show, apart from the necessary catalytic activity, a high resistance against hot acids.

There has been suggested a number of binary compounds of the transition-metals, singly or in mixtures, as catalysts (G. Bianchi and coworker, Z. physikal. Chem. 226 (1964) 40–58; French Pat. 1,436,504). But only in selected cases are they sufficiently acid-resistant, especially under anodic stress, and they are also catalytically active in very different degrees. In this group, the tungsten-carbide occupies a special position. In tests which extended over periods of weeks it provided to be stable against hot (70° C.) sulfuric acid and capable of catalyzing the anodic hydrogen oxidation.

The use of tungsten-carbide in gas electrodes offers no difficulties in general, as the substance is easily converted with synthetic resin to a porous thermoplastic mass which conducts the electric current (French Pat. 1,486,723). Examples of processes for the treatment of tungsten-carbides will be found hereinafter (Examples 1 and 2). Care must be taken that as large as possible a surface of tungsten-carbide is accessible both for the electrolyte as well as for the hydrogen. The best way to achieve this is with the use of porous electrodes consisting of a gas-permeable layer which is not wettable by the electrolyte and a further layer which is wettable by the electrolyte, respectively. In the latter layer the tungsten-carbide is distributed with the lowest possible granule-size, i.e., to give a large surface.

Methods which produce tungsten-carbide in the required fine distribution are also known and such products can be commercially purchased. However, in these products the catalytic activity is not very high and therefore only low current density can be achieved. Furthermore, the activity of test portions from different manufacturing experiments varies, and the same effect is found also in laboratory preparations.

Surprisingly, the activity of the tungsten-carbides is remarkably greater and, in addition, is much less subject to fluctuations if the manufacturing process is conducted in such manner that the preparation contains a small quantity of certain additives or admixtures.

There has been found especially that those metals which produce carbide under the manufacturing conditions of the preparations and with a melting point of 2000° C., possess an outstanding improvement influence on the tungsten-carbide catalysts. However, it has become apparent that this is not a clear cut criterion, as for example, zirconium which likewise forms a high-melting carbide, effects no improvement in the tungsten-carbide catalysts (see Table 1 hereinbelow). The desired improvement effect on the carbide is rather limited to certain single metals.

The invention is concerned with transition-metals of Groups IV and V of the Periodic System (Table) of the elements, i.e., titanium, vanadium, niobium and tantalum whose carbides in contradistinction to the hexagonal tungsten-carbide, crystallize in the cubic lattice. The aforementioned metals cause an important increase in the catalytic activity, especially in quantities of from 0.01 to 5 atom-percent, the optimum for each admixture varies in concentration which value is best ascertained by experiments. It is required that the foreign (added) carbide be, in effect, embedded in the tungsten-carbide; thus, the addition of a carbide produced separately does not give this desired result. This is surprising from several viewpoints, although the influence of the impurities in catalysts, disturbing the build-up of the crystal-lattice structure and thereby leading to lattice irregularities is a well-known fact. Thus, on the one hand, several of the aforementioned carbides (for example, vanadium carbide) of themselves not resistant against hot sulfuric acid under anodic stress, yet are not dissolved from the tungsten-carbide preparation of this invention. On the other hand, there can be observed in commercial products with high titanium-carbide content (30 to 50 mol-percent TiC in WC) that electrodes produced therefrom have been rendered as expected completely passive; they thereby block the anodic current through the formation of a nonconductive surface layer. Yet it is especially titanium which, when added in small quantities, has an especially favorable influence (see Table 1). Both such manifestations indicate that certain small quantities of foreign substances become particularly strongly incorporated into the crystal lattice of the tungsten-carbide, the latter in itself being foreign to them.

The extent to which the several admixtures affect the catalytic activity is shown in Table 1 hereinbelow. In this table the values indicated are in millivolts relative to an autogenous hydrogen electrode in the same electrolyte (2 N $H_2SO_4$, 70° C.). The values result when the given current densities on the hydrogen-flushed electrodes were galvanostatically maintained. The composition of the electrodes was identical in all cases (80% by weight tungsten-carbide, 15% by weight electrically conductive active carbon, 5% by weight polyethylene (see Example 1). Corresponding results were obtained also with electrodes of different structure, for example with hydrophobe gas electrodes with PTFE-matrix (Example 2).

The tungsten-carbide preparations which had additives were produced according to the following process:

Tungsten, the selected alloy metal, and a quantity of carbon corresponding stoichiometrically with the total quantity of metal are mixed in very fine pulverized form, pressed into tablets and heated in the graphite crucible for two hours under hydrogen to 1400° C. The tablets thus sintered together are then ground and treated for 24 hours with hot sulfuric acid. After that they are washed until neutral and dried. Only the particles of granule size smaller than 25 μm. are utilized for the production of electrodes.

TABLE 1

| Substance (additives in mol-percent) | Operating voltage (mv.) at— | |
|---|---|---|
| | 20 ma./cm.² | 50 ma./cm.² |
| Tungsten-carbide (pure) | 230 | 420 |
| Tungsten-carbide plus— | | |
| 0.1% TiC | 150 | 270 |
| 0.5% TiC | 160 | 300 |
| 2.5% TiC | 190 | 330 |
| 0.1% NbC | 220 | 390 |
| 0.5% NbC | 185 | 330 |
| 2.5% NbC | 235 | 440 |
| 0.5% ZrC | 210 | 450 |
| 0.1% VC | 160 | 300 |
| 0.5% VC | 140 | 260 |
| 0.1% TaC | 200 | 370 |
| 0.5% TaC | 190 | 330 |
| 2.5% TaC | 190 | 340 |

It is obvious that the optimum of catalytic activity (recognizable as the smallest possible polarization of the electrode) is in the case of the titanium at or below 0.1 mol-percent, in the case of niobium approximately 0.5 mol-percent, and in the case of vanadium and tantalum above 0.5 mol-percent.

The above-mentioned elements differ among themselves also in other respects regarding their effect on the tungsten-carbide electrodes: hydrogen-electrodes with tungsten-carbide for instance, have the characteristic that they do not display immediately their complete catalytic activity when first being put into operation after being produced; in fact, it is found that they require time lapses of several hours to days under current stress in order to diminish the polarization, much higher at the beginning, to reach the low values given in the table. The reason for this phenomenon is unknown, but one theory is that the formation of surface layers of some unknown oxides of the tungsten are responsible for the high catalytic effectiveness. Regarding the time necessary for this procedure, the several mentioned additives differ as follows: with the addition of titanium or vanadium, a remarkably faster, stable potential value is reached as with niobium and tantalum. In addition thereto, the low polarizations with titanium or vanadium addition are always maintained while with a niobium or tantalum supplement, a slowly mounting potential can be measured.

EXAMPLE 1

1.20 g. of treated tungsten-carbide according to the aforegiven description (<25 μm),
0.21 g. conductive active carbon,
0.075 g. polyethylene powder,
0.2 ml. of a polytetrafluoroethylene-suspension containing 5% by weight of solid material.

The above ingredients are homogeneously mixed in a mortar; the flaky cake thus produced is again comminuted in a mill. The mass is then packed into a cylindrical, heatable mold of 12 mm. diameter and heated to 140° C. for 30 minutes under a pressure of 1.5 mp./cm.². After the cooling is completed the pressure is turned off. The 3 mm. (approximately) thick briquette, the electrode, is affixed onto the end of a tube of synthetic resin in such a manner that it closes the opening. The end of the tube with the electrode so affixed is put into a receptacle containing 2 N sulfuric acid and hydrogen under pressure is then fed into the tube. The pressure is so regulated that a uniform stream of gas bubbles is released from the whole porous electrode. The pressure is approximately ½ atm. From a direct-current supply, betwen the electrode and a carbon electrode, which is in the same receptable, a current is flowing while there is measured the voltage built up between the electrode and a reference electrode (platinous hydrogen electrode) at a certain current density. This polariaztion is a measure for the losses of energy occurring in the electrode. The values of Table 1 above were measured with electrodes of this kind.

EXAMPLE 2

8.67 g. of treated tungsten-carbide, according to the aforegiven description
0.91 g. conductive active carbon,
0.35 g. polyethylene powder,
2.5 ml. polytetrafluoroethylene-suspension containing 5% by weight of solid material.

The above ingredients are treated as in Example 1 and filled into a briquette mold of 48 mm. diameter. Without the use of heat, pressure of 0.5 mp./cm.² is exerted. Then, with the open form, a porous polytetrafluoroethylene-disk of 48 mm. diameter and approximately 1 mm. thickness is placed onto the compact; the form is then closed and under a pressure of 1.5 kp./cm.² it is heated up to 140° C. After an hour the completed electrode can be taken from the form. The impermeability of the PTFE layer against the electrolyte is so great that no excessive pressure of gas is necessary to handle the electrode in a device as described in Example 1 as hydrogen electrode, whereby the tungsten-carbide containing layer is turned toward the electrolyte and the PTFE-layer is turned toward the gas chamber. Because of the different hydrogen pressure the measuring values cannot be directly compared with those of the electrodes as produced in Example 1.

Although the invention is illustrated and described with reference to a plurality of embodiments thereof, it is to be expressly understood that it is in no way limited to the disclosure of such preferred embodiments, but is capable of numerous modifications within the scope of the appended claims.

What is claimed is:
1. Hydrogen electrodes having tungsten carbide as catalyst adapted for use in fuel cells with acid electrolytes, in which the tungsten-carbide contains at least one carbide of the metals selected from the group consisting of titanium, vanadium, niobium and tantalum in a quantity of 0.01 to 2.0 mole percent, the recited additional metals being disposed within the crystal lattice of the tungsten carbide.

2. Hydrogen electrodes as described in claim 1, in which the tungsten-carbide contains 0.01 to 0.5 mole percent titanium-carbide.

3. Hydrogen electrodes as described in claim 1, in which the tungsten-carbide contains 0.1 to 2.0 mole percent vanadium carbide.

4. Hydrogen electrodes as described in claim 1, in which the tungsten-carbide and the metal carbide therein is distributed in one layer consisting of porous, water-repellent synthetic resin.

5. Hydrogen electrodes as described in claim 4 in which the water-repellent synthetic resin is polytetrafluoroethylene.

References Cited

UNITED STATES PATENTS 3,380,856   4/1968   Pohl _____ 136—120

FOREIGN PATENTS 1,486,723   5/1967   France _____ 136—120
1,135,076   11/1968  Great Britain _____ 136—120
6715527     5/1968   Netherlands _____ 136—120 FC L. DEWAYNE RUTLEDGE, Primary Examiner M. J. ANDREWS, Assistant Examiner